Patented Apr. 28, 1931

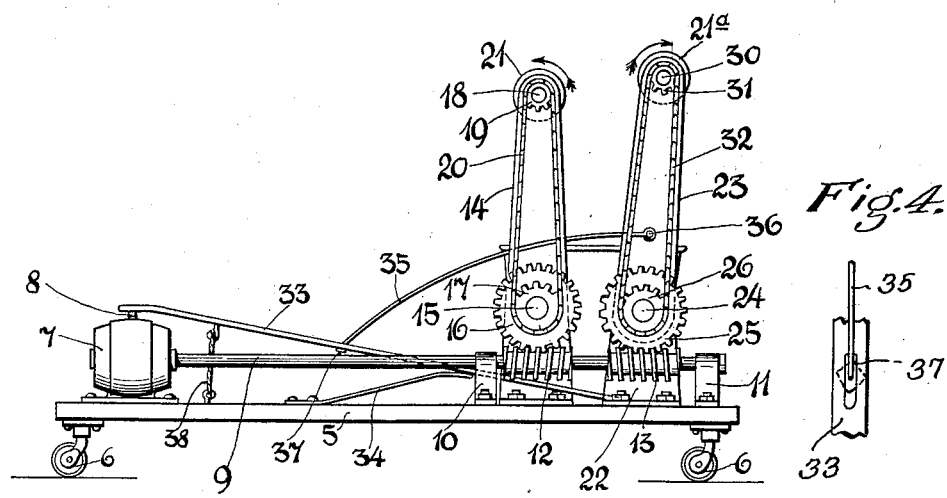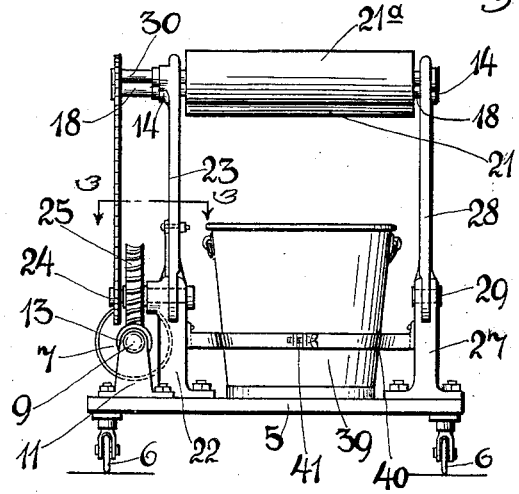

1,803,297

UNITED STATES PATENT OFFICE

HERMAN L. SCHNEIDER, OF CHICAGO, ILLINOIS

WRINGER

Application filed April 14, 1928. Serial No. 270,093.

The invention relates to wringers and especially to wringers of that type used for wringing out mops or the like.

The object of the invention is to provide a wringer having a motor driving the two rollers of said wringer in opposite directions.

A further object of the invention is, to provide a wringer, the rollers whereof are normally located at a distance from each other and thereby are adapted to receive the mop to be wrung out between them, means being provided for arranging said rollers in working position and keeping in said position, while the motor drives the rollers.

Other objects of the invention not specifically mentioned may be easily ascertained and understood from the following description in connection with the accompanying drawings forming a part thereof. It is however to be noted, that the invention is not to be limited or restricted to the exact construction and formation shown in the drawings and described in the specification, but that said invention is only to be limited by the scope of the claims appended hereto.

The drawings represent a preferred embodiment of the invention, and in said drawings Fig. 1 is a side elevation of the wringer according to the present invention, and Fig. 2 is an end view of Fig. 1.

Fig. 3 is a top plan view of the device on line 3—3, Fig. 2.

Fig. 4 is a detail view of the parts 33, 35 and 37.

The wringer has a base board 5 provided at its corners with castors 6. An electric motor 7 is mounted on said board and an electric, normally open spring switch 8 is arranged on top of said motor to close and open respectively the circuit feeding the motor. It is to be understood, that the motor is provided with the usual electric connection (not shown) adapting the motor to be energized from any electric light socket or the like. The motor has a shaft 9 extending longitudinally of the base board and journaled in bracket bearings 10 and 11. The bearings are mounted on the board and spaced from each other. Two worms 12 and 13 are mounted on the shaft 9 between the bearings. One of said worms is a right hand worm and the other a left hand one.

A pair of brackets 14 is mounted on the base board, one of them adjacent the bearing 10 and the other one on a corresponding place adjacent the opposite longitudinal edge of the board. A short shaft 15 is journaled in the first mentioned bracket 14, and a worm gear 16 is mounted rigidly on this short shaft and meshes with the worm 12. A sprocket gear 17 is also rigidly mounted on the short shaft and a cross shaft 18 extends from one bracket 14 across the board to the other bracket and is journaled in said brackets. A second sprocket gear 19 is rigidly mounted on this cross shaft and is located vertically above the first mentioned sprocket gear 17. A sprocket chain 20 is trained over said two sprocket gears. A roller 21 is rigidly mounted on the cross shaft 18 and extends practically over the whole distance between the two brackets 14.

Adjacent the bearing 11 and the worm 13 a short upright bracket 22 is fastened to the board. The upper end of this bracket is bifurcated and a bracket bar 23 is pivotally mounted between the prongs of said bifurcation on a short shaft 24 journaled in said prongs. A second worm gear 25 is rigidly mounted on said short shaft and meshes with the worm 13. On the outer end of the short shaft 24 a third sprocket gear 26 is rigidly mounted. On a place corresponding with the short upright bracket 22 on the opposite longitudinal side of the base board a second short upright bracket 27 is mounted, the upper end whereof is also bifurcated and a second bracket bar 28 is pivotally mounted between the prongs of this bifurcation on a pin 29 or the like extending through registering openings provided in the prongs and the bracket bar. A second cross shaft is journaled in the two bracket bars. On one end of said cross shaft, in the same vertical plane with the sprocket gear 26 on the short shaft 24 another sprocket gear 31 is rigidly mounted and a second sprocket chain 32 is trained over the gears 26 and 31. A second roller 21a is rigidly mounted on the second cross shaft 30 and extends between the two bracket bars.

A pedal lever 33 is hingedly mounted (not shown) to the base board. A spring 34 is arranged between the board and the pedal lever and urges the latter upwardly. The free end of said lever is located above the spring switch 8 and closes said switch, when it is forced downwardly. In the pedal lever intermediate the ends thereof an opening is provided and one end of a curved rod 35 extends through said opening. The other end of this rod is pivotally attached to the first bracket bar 23, as indicated at 36 in Fig. 1. The end of rod 35 extending through the pedal lever is threaded and a nut 37 is screwed upon this end to prevent the rod from slipping out of said opening. By means of tightening or loosening said nut the angularity between the pedal lever and the bracket bars may be changed and adjusted. When the pedal lever is pressed downwardly the frame consisting of the two bracket bars and the second cross shaft is pivoted toward the first roller 21. The relative dimensions of the brackets 14, the bracket bars 23 and 28, and the distance between the former and the latter is such that, the two rollers will be located in co-operative working position, when the bracket bars are pivoted by the pedal being forced downwardly. Adjacent the free end of the pedal lever a cord 38 or the like is fastened with one of its ends to the lever and with the other end to the board to limit the upward movement of said lever.

A pail 39 is removably held on the board in such a position, that a mop, which is inserted between the rollers, will enter said pail. In order to hold the pail securely but removably in place an adjustable holding ring 40 may be fastened to the brackets 22 and 27.

The wringer operates as follows: The pail 39 is filled with water and is placed in position. The holding ring 40 is tightened by means of the adjusting screw 41. The apparatus is taken to the place to be cleaned and the motor is connected with a source of electric power. The mop is inserted between the two rollers and into the water in the pail. It is then pulled up far enough, so that it is located between the rollers. Then the lever 33 is pushed downwardly. Thereby the relatively movable roller 21a is forced toward the relatively stationary roller 21 clamping the mop between said rollers. At the end of this downward movement of the pedal lever the switch 8 is closed, the motor is started and by means of the worm 12, worm gear 16, sprocket gear 17, chain 20, and gear 19 the relatively stationary roller 21 is rotated in the direction indicated by the arrow shown adjacent said roller, while the relatively movable roller 21a will be rotated in the opposite direction by means of the worm 13, the worm gear 25, the sprocket gear 26, the chain 32, and the gear 31. By the rotation of the rollers the mop will be forced upwardly and out of its position between said rollers, and at the same time it will be wrung out.

What I claim as new is:—

1. In a device of the class described an electric motor, a pair of wringer rollers, a normally open spring switch for said motor, means for operating said switch, means for moving said rollers to co-operative working position, the switch operating means being arranged in the path of movement of the roll moving means so that the last named means are adapted to actuate said switch, and means arranged between the motor and said rollers for rotating the latter.

2. In a device of the class described an electric motor, a normally open spring switch for said motor, a relatively stationary roller, a second roller movable in relation to the first roller, means interposed between the motor and the rollers for simultaneously driving said rollers in opposite directions, means for moving the second roller into working position relative to the first roller and means for closing the switch, said means being arranged in the path of movement of the roll moving means, adapting the latter to close the switch after having arranged the second roller in said position.

3. In a device of the class described a portable base, an electric motor thereon, a switch for said motor, a stationary frame on said base, a roller rotatably supported by said frame, a pivotally mounted frame, a second roller rotatably supported by said second frame, a set of gears adapted to rotate the first roller, a second set of gears adapted to rotate the second roller, a shaft on said motor, means on said shaft for driving the first set of gears in one direction and the second set of gears in the opposite direction, a lever pivotally mounted on said base, a connecting rod arranged between said lever and the pivotally mounted frame and adapted to move the second roller with said frame into co-operative position in relation to the second roller, and means for urging said roller and frame out of co-operative position, the motor switch being arranged in the path of movement of said lever and the latter being adapted at the end of its downward movement to close the switch for the motor.

In witness whereof I affix my signature.

HERMAN L. SCHNEIDER.